UNITED STATES PATENT OFFICE.

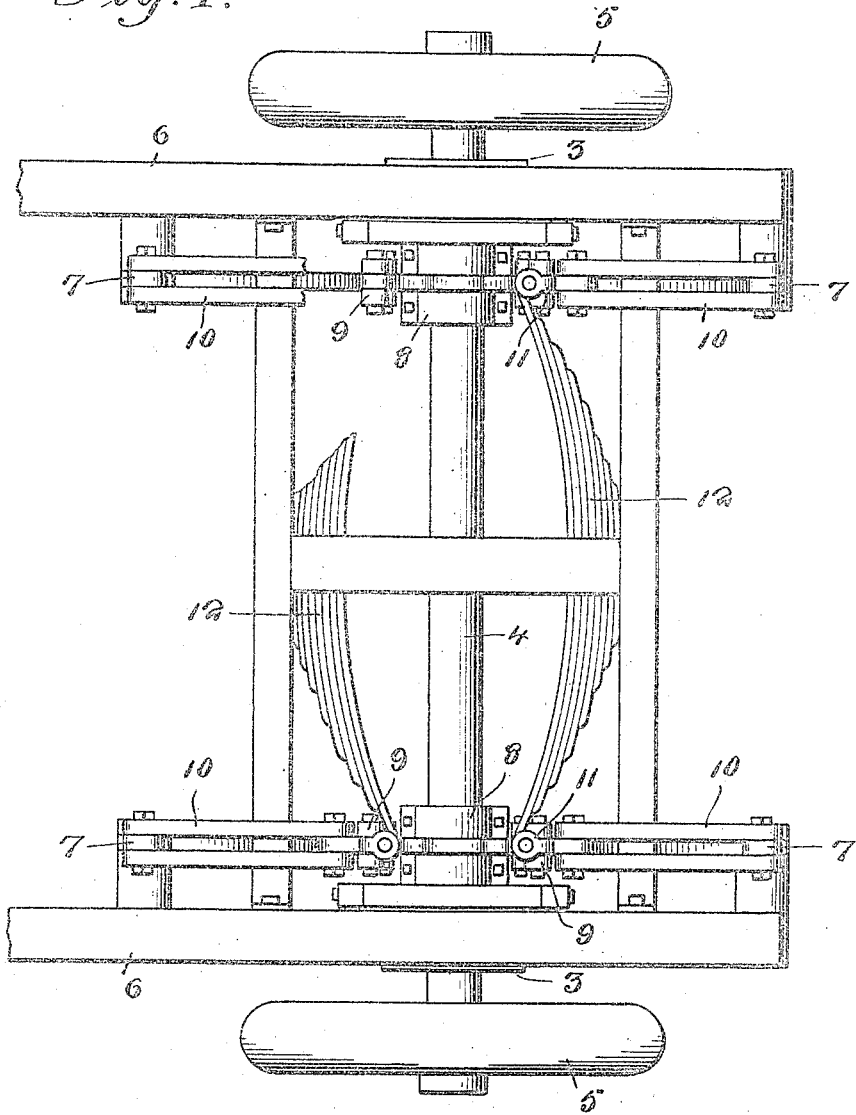

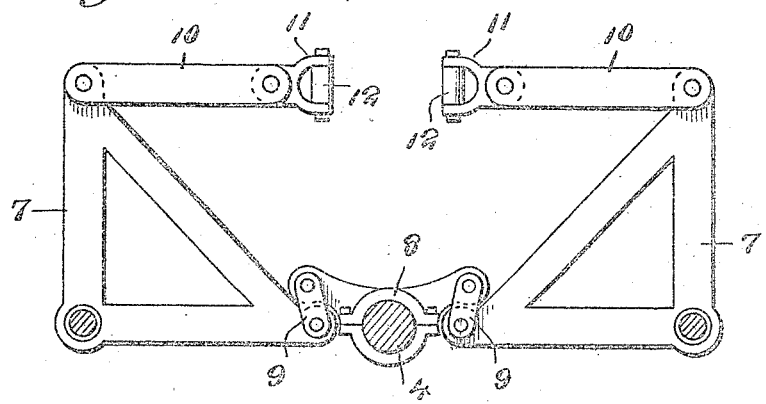
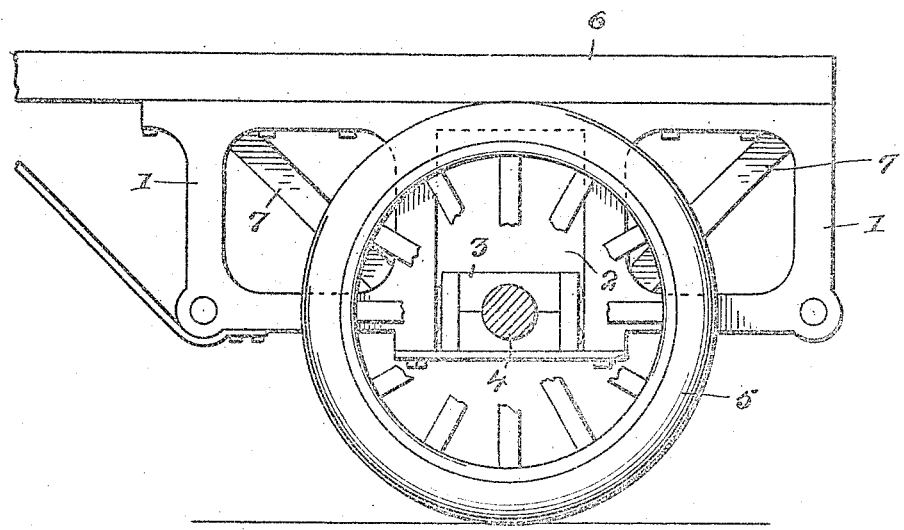

JOSEPH SCOPELLITI, OF HARRISON, NEW JERSEY.

SHOCK-ABSORBER.

1,248,175.

Specification of Letters Patent.

Patented Nov. 27, 1917.

Application filed April 20, 1917. Serial No. 163,448.

*To all whom it may concern:*

Be it known that I, JOSEPH SCOPELLITI, a subject of the King of Italy, residing at Harrison, in the county of Hudson and State of New Jersey, have invented new and useful Improvements in Shock-Absorbers, of which the following is a specification.

This invention relates to shock absorbers adapted to be used upon automobiles, flying machines and other light structures and it consists in the novel features hereinafter described and claimed.

An object of the invention is to provide a shock absorber of simple and durable structure which when applied will relieve the body of a vehicle from shock incident to sudden jars as the vehicle passes over obstructions or rough places. The structure is such that it reduces the vibration of the body to a minimum and also prevents lateral movement of the body with relation to the running gear. The structure also relieves the axle of the vehicle from the direct weight of the body when the vehicle passes over rough places and consequently the occupant or the body of the vehicle is not jostled or jolted.

With this object in view the shock absorber comprises brackets adapted to be applied to the frame of the vehicle and having bearings mounted for vertical sliding movement therein. An axle is carried by the bearings and wheels are supported at the ends of the axle in a usual manner. Bell crank levers are pivoted to the brackets at the opposite sides of the axle and the inner portions of the said bell crank levers are connected by means of links with collars which receive the end portions of the axle. The upper ends of the bell crank levers are connected by means of links and yokes with springs which are mounted upon the frame of the vehicle.

In the accompanying drawing:—

Figure 1 is a top plan view of the shock absorber;

Fig. 2 is a vertical sectional view of the same;

Fig. 3 is a side elevation of the same.

The shock absorber comprises brackets 1 which are adapted to be bolted or otherwise secured to the frame of a vehicle to which the device is applied. The said brackets are provided with vertically disposed openings 2. Split bearings 3 are located in the openings 2 of the bracket 1 and may move vertically therein. The said bearings 3 receive an axle 4 which in turn carries at its ends wheels 5 in a usual manner. The frame to which the brackets 1 are attached is indicated at 6. This frame may be of any usual design and as hereinbefore indicated it may be the frame of an automobile or that of a flying machine or other similar machine.

Bell crank levers 7 are pivoted to the lower end portion of the brackets 1 and are located at the opposite side of the axle 4. Split collars 8 receive the end portions of the axle 4 and are pivotally connected with the inner ends of the bell crank levers by means of links 9. Links 10 are pivotally connected with the upper end of the bell crank levers 7 and the links 10 at the same end portion of the axle 4 extend inwardly toward each other and are provided at their inner ends with pivoted yokes 11. The yokes 11 are connected with the ends of semi-elliptic springs 12 which in turn are attached to the frame 6 of the vehicle.

It is apparent that during the upward movement of the axle, the movement of the collars, bell crank levers and links increases in ratio to the distance between the axle and the body of the vehicle to which the brackets are attached, and that the initial displacement of the axle is so slight as to be hardly perceptible. The result is that the body of the vehicle which is mounted upon the frame remains practically in its normal position during the slight up and down movement of the axle, under ordinary conditions, but when the axle is displaced to a greater extent by reason of the fact that the wheels pass over obstructions the mitigating action of the springs increases proportionately and hence the frame and body of the vehicle are relieved of excessive jar and the incident shock is absorbed.

From the foregoing description taken in conjunction with the accompanying drawing, it will be seen that a shock absorber of simple and durable structure is provided, and that the same is automatic in its action, and tends to materially relieve the frame and body of a vehicle from shock when the supporting wheels are passing over fixed obstructions in the path of travel of the vehicle.

Having described the invention what is claimed is:—

In combination with a frame of a vehicle, a shock absorber comprising brackets applied to the frame of the vehicle and provided with openings, bearings mounted for vertical movement in the openings, an axle carried by the bearings, bell crank levers pivoted to the brackets and located at the opposite sides of the axle, there being a pair of bell crank levers at each end of the axle, collars mounted upon the axle, links pivotally connecting said collars with one of the arms of the bell crank levers, springs mounted upon the frame of the vehicle and located at the opposite sides of the axle, other links pivotally connected with the other arms of the bell crank levers, and yokes pivotally connected with the last mentioned links and operatively connected with the springs.

In testimony whereof I affix my signature.

JOSEPH SCOPELLITI.

Witness:
J. D. SIBET.

Copies of this patent may be obtained for five cents each, by addressing the "Commissioner of Patents, Washington, D. C."